United States Patent [19]

Belde et al.

[11] Patent Number: 4,464,203

[45] Date of Patent: Aug. 7, 1984

[54] HIGHLY CONCENTRATED, DUST-FREE, SOLID AND READILY DISPERSIBLE PIGMENT FORMULATIONS AND THEIR USE

[75] Inventors: Horst Belde, Ludwigshafen; Eduard Hartmann, Limburgerhof; Ewald Daubach, Ludwigshafen, all of Fed. Rep. of Germany

[73] Assignee: BASF Aktiengesellschaft, Ludwigshafen, Fed. Rep. of Germany

[21] Appl. No.: 448,049

[22] Filed: Dec. 8, 1982

[30] Foreign Application Priority Data

Dec. 29, 1981 [DE] Fed. Rep. of Germany ....... 3151753

[51] Int. Cl.$^3$ ................................................ C09C 3/08
[52] U.S. Cl. ................................................ 106/308 N
[58] Field of Search ................................... 106/308 N

[56] References Cited

U.S. PATENT DOCUMENTS

| 3,841,888 | 10/1974 | Belde et al. | 106/308 N |
| 3,947,287 | 3/1976 | Belde et al. | 106/308 Q |
| 3,960,486 | 6/1976 | Daubach et al. | 8/79 |
| 4,056,402 | 11/1977 | Guzi, Jr. | 106/308 Q |

FOREIGN PATENT DOCUMENTS

| 1489693 | 10/1977 | United Kingdom | 106/308 Q |
| 1537374 | 12/1978 | United Kingdom | 106/308 N |
| 1588777 | 4/1981 | United Kingdom | 106/308 M |

Primary Examiner—James Poer
Attorney, Agent, or Firm—Oblon, Fisher, Spivak, McClelland & Maier

[57] ABSTRACT

Highly concentrated, dust-free, solid and readily dispersible pigment formulations contain
(a) from 70 to 95% by weight of one or more finely divided pigments,
(b) from 5 to 30% by weight of one or more surfactants which possess 20–45% by weight of ethylene oxide units, have a mean molecular weight of from 4,000 to 15,000 and are obtained by reacting an amine of the formula

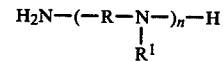

where R is $C_2$–$C_6$-alkylene, $R^1$ is H or $C_1$–$C_4$-alkyl and n is 1, 2, 3, 4 or 5, or R is 1,3-phenylene, 1,4-phenylene or 4,4'-diphenylenemethane, $R^1$ is H and n is 1, with propylene oxide and then reacting the product with ethylene oxide, and
(c) from 0 to 5% by weight of waxes and/or antifoams, with or without
(d) other agents conventionally used in pigment formulations, the percentages being based on (a+b+c).

The formulations are very useful for pigmenting aqueous, alcoholic or aqueous/alcoholic printing inks and surface coatings, and printing pastes for textiles.

18 Claims, No Drawings

HIGHLY CONCENTRATED, DUST-FREE, SOLID AND READILY DISPERSIBLE PIGMENT FORMULATIONS AND THEIR USE

The present invention relates to highly concentrated, dust-free, solid and readily dispersible pigment formulations, and their use for the production of aqueous or aqueous/alcoholic printing inks.

Aqueous or aqueous/alcoholic printing inks as a rule contain bases, such as alkali metal hydroxides, ammonia or amines, soluble resins, eg. colophonium, maleate, phthalate or acrylate resins, shellac, casein, etc. as binders.

German Laid-Open Application DOS No. 2,729,892 discloses solid pigment formulations which contain finely divided pigments in carboxyl-containing polymers based on acrylic acid or methacrylic acid and acrylates or methacrylates. These formulations are very suitable for the above printing inks.

A disadvantage of the pigment formulations of the above type is that, in the production of printing inks, the choice of further binders and/or assistants is not free, since not all binders are compatible with one another, and the binders may have an adverse effect on each other's properties.

It is an object of the present invention to provide pigment formulations which do not have the disadvantages of the prior art formulations.

We have found that this object is achieved, and that pigment formulations which are universally usable in aqueous, alcoholic or aqueous/alcoholic media are obtained, if the formulations contain
  (a) from 70 to 95% by weight of one or more finely divided pigments,
  (b) from 5 to 30% by weight of one or more solid surfactants obtained by reacting an amine of the formula

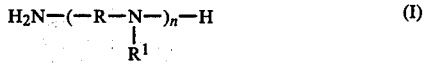

where R is $C_2$–$C_6$-alkylene, $R^1$ is H or $C_1$–$C_4$-alkyl and n is 1, 2, 3, 4 or 5, or R is 1,3-phenylene, 1,4-phenylene or 4,4'-diphenylenemethane, $R^1$ is H and n is 1, with propylene oxide and then reacting the product with ethylene oxide, the block copolymer possessing 20–45% by weight, based on the block copolymer, of ethylene oxide units and having a mean molecular weight of from 4,000 to 15,000, and
  (c) from 0 to 5% by weight of one or more waxes and/or antifoams, with or without
  (d) other additives conventionally used in pigment formulations, the percentages being based on (a+b+c).

The novel formulations are very useful for pigmenting aqueous, alcoholic or aqueous/alcoholic printing inks and surface coatings.

The novel formulations are very suitable for use in a large variety of binder systems, and can, for example, also be used for pigmenting printing inks and surface coatings which contain cationic resins. The novel pigment formulations give deep and brilliant colorations.

Furthermore, the printing inks and surface coatings produced with the pigment formulations according to the invention exhibit good adhesion on a large variety of materials, eg. polyethylene, PVC and aluminum foil, produce very wetfast prints, and have high gloss and other excellent tinctorial properties.

These findings were surprising in view of the fact that German Laid-Open Application DOS No. 2,729,892 has disclosed that the addition of the surfactants to formulations comprising pigments and carboxyl-containing copolymers to produce printing inks and surface coatings has an adverse effect, resulting in a reduction in the dispersibility and in the glossiness. Furthermore, according to this Laid-Open Application, the color strength and the transparency are also adversely affected as the concentration of surfactant increases.

Either inorganic or organic pigments may be used as component (a) of the formulation.

Examples of inorganic pigments are titanium dioxide, carbon black, iron oxides, lead chromate/lead molybdate pigments, nickel titanium yellow pigments and/or chromium(III) oxide.

Examples of organic pigments are those from the azo series, and from the series comprising the perylenetetracarboxylic acid diimides, the phthalocyanines, anthraquinone, the perinones, thioindigo, the dioxazines, the isoindoline pigments, polycyclic compounds containing keto groups and 4 or more fused aromatic and/or heteroaromatic rings, and/or the metal complexes.

It is also possible for the formulations to contain a mixture of inorganic and organic pigments.

Suitable surfactants (b) are those obtained by reacting an amine of the formula I

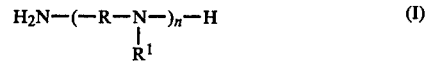

where R is straight-chain or branched $C_2$–$C_6$-alkylene, $R^1$ is H or $C_1$–$C_4$-alkyl and n is 1, 2, 3, 4 or 5, or R is 1,4-phenylene, 1,3-phenylene or 4,4'-diphenylenemethane, $R^1$ is H and n is 1, with propylene oxide (PO) and then reacting the product with ethylene oxide (EO). The ratio of propylene oxide to ethylene oxide is chosen o that the product, which is a PO/EO block copolymer, contains from 20 to 45% by weight of EO and has a mean molecular weight of from 4,000 to 15,000, preferably from 11,000 to 15,000.

Examples of amines of the formula I are ethylenediamine, diethylenetriamine, triethylenetetramine, tetraethylenepentamine, 1,2- and 1,3-propylenediamine, dipropylenetriamine, tripropylenetetramine, butylenediamine, 1,6-hexamethylenediamine, 1,3-diamino-2,2-dimethylpropane, 1,2-, 1,3- and 1,4-phenylenediamine and 4,4'-diaminodiphenylmethane, as well as mixtures of these.

Surfactants (b) based on ethylenediamine, 1,3-phenylenediamine or 1,4-phenylenediamine are preferred, those based on ethylenediamine being particularly preferred since they give stable formulations with particularly good performance characteristics.

(b) is prepared by a conventional method.

Surfactants (b) which are based on ethylenediamine, have a mean molecular weight of from 11,000 to 14,000 and contain from 30 to 45% by weight, based on the block copolymer, of ethylene oxide units are very particularly preferred because of their advantageous properties.

The formulations can, as further constituents (c), also contain waxes or antifoams or mixtures of these. Furthermore, the formulations may also contain small amounts of water and minor amounts of other agents (d) conventionally used in pigment formulations. The amount of (d) should be as a rule no more than 10%, preferably no more than 5%, based on (a+b+c).

The agents (c) improve the surface and the abrasion resistance of the colorations and prevent any foam formation which may occur during production and/or processing of the inks and surface coatings.

Agents (d) are, for example, assistants used in the production of the formulations, eg. in dispersing the pigments, or in isolating the formulations. Examples of additives for these purposes are aluminum hydroxide, acidic acrylic resins and/or pH-controlling agents, such as buffer substances, acids or bases, eg. sulfonic acids or triethanolamine.

The novel pigment formulations can be prepared in a conventional manner, using a variety of methods. Thus, a formulation comprising the pigment and the surfactant (b) can be prepared by a method wherein the components are stirred into an aqueous medium or kneaded or milled in an aqueous medium, for example in a stirred ball mill, an attrition mill, a ball mill, a sand mill or a bead mill, and the product obtained is then dried. The surfactant (b) is added before the pigment is dispersed.

The novel formulations are suitable for pigmenting varnishes for a large variety of uses, for example for coloring or printing paper, wallpaper, decorative papers, aluminum foil, plasticized PVC, rigid PVC, polyethylene, polypropylene and a large variety of fabrics, as well as leather and imitation leather. The formulations may also be used to produce pastes for printing textile fabrics.

The inks and surface coatings containing the novel pigment formulations can be used in the gravure printing, flexographic printing, screen printing or pigment printing process, or can be applied by spraying, brushing or knife coating.

The examples which follow illustrate the invention. Parts and percentages are by weight.

The formulations produced in the examples were tested in the following aqueous flexographic printing ink: I.

20 parts of pigment formulation are introduced into 80 parts of binder solution (varnish), and the mixture is stirred for 30 minutes with a high-speed stirrer. The binder used is a mixture of 47 parts of a carboxyl-containing acrylate resin, 25 parts of water, 25 parts of ethanol and 2 parts of 25% strength aqueous ammonia solution.

EXAMPLE 1

60 parts of C.I. Pigment Yellow 1, C.I. No. 11,680, and 15 parts of a surfactant obtained by reacting ethylenediamine with PO and then reacting the product with EO, containing 20% of EO units and having a mean molecular weight of 6,300 are kneaded, with the addition of 18 parts of water, for 1 hour, during which the temperature reaches 67° C. The finished mill base is rolled to give a film, which is dried at 80° C. in a through-circulation drier and then milled.

The pigment formulation contains 80% of the pigment, and is very useful for preparing the flexographic printing ink described under I. The printing ink obtained gives a satisfactory deep glossy yellow print on paper and on aluminum foil.

EXAMPLE 2

200 parts of water are added to 80 parts of pigmentary carbon black (BET surface area 83 m²/g) and 20 parts of a surfactant obtained by reacting ethylenediamine with PO and then reacting the product with EO, containing 40% of EO units and having a mean molecular weight of 12,500, and the mixture is then milled in a stirred ball mill (5 passes).

The aqueous dispersion is converted into a powder by spray drying.

The pigment formulation contains 80% of carbon black and, when used to pigment the flexographic printing ink described under I, the printing ink obtained gives satisfactory deep glossy black prints on paper and on aluminum foil.

EXAMPLE 3

300 parts of finely divided crude copper phthalocyanine (obtained by milling crude copper phthalocyanine for 10 hours in a ball mill in the absence of assistants; BET surface area of the mill base: 7 m²/g) and 75 parts of a surfactant obtained by reacting ethylenediamine with PO and then reacting the product with EO, containing 40% of EO units and having a mean molecular weight of 10,500 are kneaded, with the addition of 60 parts of water, for 1 hour, after which the temperature of the mill base has increased to 96° C. The finished mill base is rolled to give a film, which is dried at 80° C. and then milled.

The formulation contains 80% by weight of pigment and, when used in flexographic printing inks, gives very wetfast deep glossy blue prints on aluminum foil.

EXAMPLE 4

90 parts of β-copper phthalocyanine pigment in the form of an aqueous press cake (=334 parts) and 10 parts of a surfactant obtained by reacting ethylenediamine with PO and then reacting the product with EO, containing 40% of EO units and having a mean molecular weight of 8,300 are dispersed in a stirred ball mill (3 passes). The solid formulation is isolated in the form of granules by spraying the resulting dispersion into a fluidized bed drier.

The solid formulation contains 90% of pigment and, when used to prepare the flexographic printing ink described under I, gives glossy blue prints on aluminum foils and plastic films.

EXAMPLE 5

17 parts of water are added to 80 parts of C.I. Pigment Green 7, C.I. No. 74,260, 1 part of a silicone antifoam and 20 parts of a block copolymer obtained by reacting ethylenediamine with PO and then reacting the product with EO, containing 20% of EO units and having a mean molecular weight of 9,000, and the mixture is then kneaded for 1 hour, after which its temperature is 82° C. The finished mill base is rolled to give a film, which is dried at 80° C. and then milled. The formulation contains 80% of pigment.

When used to prepare the flexographic printing ink described in I, the printing ink obtained gives wetfast deep glossy green prints on aluminum foil.

EXAMPLE 6

160 parts of C.I. Pigment Orange 34, C.I. No. 21,115, are stirred into a solution of 40 parts of a block copolymer (obtained by reacting ethylenediamine with PO and then reacting the product with EO, containing 40% of EO units and having a mean molecular weight of 12,500) in 400 parts of water, and the mixture is dispersed in a stirred ball mill (5 passes). The formulation, which is isolated by spray drying, contains 80% of pigment and gives deep orange colorations when used for flexographic printing on paper.

EXAMPLE 7

80 parts of C.I. Pigment Red 48, C.I. No. 15,865, are dispersed in a stirred ball mill (3 passes), with the addition of 300 parts of water and 20 parts of the block copolymer described in Example 6. The water is removed by freeze drying.

The formulation obtained contains 80% of pigment and gives deep glossy red colorations when used for flexographic printing on aluminum foil.

EXAMPLE 8

80 parts of the crude copper phthalocyanine mentioned in Example 3 and 20 parts of a surfactant obtained by reacting o-phenylenediamine with PO and then reacting the product with EO, containing 40% of EO units and having a mean molecular weight of 10,500 are kneaded, with the addition of 18 parts of water, for 1 hour, during which the temperature of the mill base increases to 86° C. The finished mill base is rolled to give a film, which is dried at 80° C. and then milled. The formulation obtained contains 80% of pigment and gives deep blue colorations when used for flexographic printing on aluminum foil.

EXAMPLE 9

20 parts of a surfactant obtained by reacting ethylenediamine with PO and then reacting the product with EO, containing 40% of EO units and having a mean molecular weight of 12,500 are dissolved in 200 parts of water, 80 parts of C.I. Pigment Red 48:1, C.I. No. 15,865:1, are added, and the suspension is milled for 2 hours in an attrition mill, Siliquarzit balls of 0.6–0.8 mm diameter being used as the grinding medium. The dispersion is separated off from the grinding medium, and the formulation is isolated by spray drying.

The powder obtained contains 80% of pigment and gives brilliant red colorations on aluminum foil.

EXAMPLE 10

270 parts of Pigment White 6, C.I. No. 77,891, and 30 parts of the surfactant described in Example 9 are kneaded, with the addition of 41 parts of water, for 1 hour, after which the mill base has a temperature of 63° C. The finished mill base is rolled to give a film, which is dried at 40°–45° C. and then milled.

The formulation contains 90% of pigment and is dust-free and free-flowing and, when used to pigment the flexographic printing ink described under I, the printing ink obtained gives satisfactory prints on paper, aluminum foil or polyethylene film.

EXAMPLE 11

320 parts of Pigment Red 48:4, C.I. No. 15,865:4, and 80 parts of a surfactant obtained by reacting ethylenediamine with PO and then reacting the product with EO, containing 20% of EO units and having a mean molecular weight of 7,800 are kneaded, with the addition of 80 parts of water, for 45 minutes, after which the mill base has a temperature of 68° C. The finished mill base is rolled to give a film, which is dried at 40° C. and then milled. When used to pigment the flexographic printing ink described under I, the printing ink obtained gives deep glossy red prints on aluminum foil.

EXAMPLE 12

400 parts of Pigment Green 7, C.I. No. 74,260, 15 parts of aluminum hydroxide and 85 parts of the agent described in Example 9 are kneaded, with the addition of 100 parts of water, for one hour, after which the temperature is 82° C. The finished mill base is rolled to give a film which is dried at 40° C. and then milled. 35 parts of this formulation, which contains 80% of pigment, are stirred into 965 parts of an emulsion of the following composition: 775 parts of water, 5 parts of the surfactant present in the formulation, 5 parts of 25% strength ammonia, 50 parts of a self-crosslinking polymer based on acrylates, 30 parts of a 30% strength aqueous solution of a synthetic thickener and 100 parts of an aqueous dispersion of a self-crosslinking copolymer based on acrylates.

This printing paste is used for printing fiber materials by a conventional method. After drying and fixing (5 minutes at 140° C.), deep brilliant fast prints are obtained.

EXAMPLE 13

80 parts of Pigment Red 53:1, C.I. No. 15,585:1, and 20 parts of a surfactant obtained by reacting ethylenediamine with PO and then reacting the product with EO, containing 20% of EO units and having a mean molecular weight of 5,300 are kneaded, with the addition of 16 parts of a 1:1 water/isopropanol mixture, for 1 hours, after which the mill base has a temperature of 125° C. The finished mill base is rolled to give a film, which is dried at 40° C. and then milled.

The formulation contains 80% of pigment and, when used to pigment the flexographic printing ink described under I, the printing ink obtained gives glossy deep red prints on aluminum foil.

EXAMPLE 14

96 parts of pigmentary carbon black (BET surface area 110 m$^2$/g), 21.6 parts of the surfactant described in Example 9 and 2.4 parts of triethanolamine are kneaded, with the addition of 45 parts of water, for 2 hours, after which the finished mill base has a temperature of 55° C.

The pigment formulation contains 80% of carbon black and, when used to prepare the flexographic printing ink described under I, the printing ink obtained gives high-gloss deep black prints on aluminum foil.

EXAMPLE 15

40 parts of Pigment Yellow 17, C.I. 21,105, and 10 parts of a surfactant obtained by reacting 4,4'-diaminodiphenylmethane with PO and then reacting the product with EO, containing 45% of EO units and having a mean molecular weight of 11,500 are kneaded, with the addition of a mixture of 4 parts of water and 4 parts of i-propanol, for 2 hours, after which the temperature of the mill base is 50° C.

When the formulation is used to prepare the flexographic printing ink described under I, the ink obtained gives deep glossy colorations on aluminum foil, polyethylene film and paper.

EXAMPLE 16

80 parts of Pigment Red 48:1, C.I. No. 15,865:1, 3 parts of a copolymer obtained from 60 parts of styrene and 40 parts of acrylic acid (acid number 250; mean molecular weight 1,000), and 17 parts of the agent described in Example 9 are kneaded, with the addition of 14 parts of i-propanol, for 1 hour, after which the product has a temperature of 73° C. The finished mill base is rolled, using a friction roller, to give a film, which is dried at about 40° C. and then comminuted to give a grit-like product.

The formulation contains 80% of pigment and, when used to prepare the flexographic printing ink described under I, the ink obtained gives deep brilliant wetfast red prints on polyethylene films.

EXAMPLE 17

180 parts of the crude copper phthalocyanine described in Example 3, 120 parts of Pigment Blue 27, C.I. 77,510, 75 parts of the surfactant described in Example 9 and 65 parts of water are kneaded for 3 hours, after which the temperature of the mill base has increased to 90° C. The finished mill base is rolled to give a film, which is dried at 40° C. and then milled.

The pigment formulation, when used to pigment a flexographic printing ink, gives deep brilliant glossy reddish blue prints of aluminum foil.

EXAMPLE 18

40 parts of Pigment Violet 27, C.I. 42,535:3, 10 parts of the surfactant described in Example 11 and 37 parts of ethyl acetate are kneaded for 1 hour, after which the temperature of the mill base is 40° C. The finished mill base is rolled, using a friction roller, to give a film, which is dried at 40° C. and then milled.

The formulation contains 80% of pigment and, when used to prepare the flexographic printing ink described under I, the ink obtained gives brilliant deep violet prints on paper.

EXAMPLE 19

37.5 parts of Pigment Blue 62, 25 parts of aluminum hydroxide, 10 parts of the agent described in Example 5 and 23 parts of water are kneaded for 1 hour, after which the temperature is 53° C. The finished mill base is rolled, dried and milled.

The formulation obtained contains 75% of pigment and gives a printing ink which produces brilliant blue colorations on paper.

EXAMPLE 20

80 parts of Pigment Red 102, C.I. 77,491, 20 parts of the surfactant described in Example 2 and 17 parts of water are kneaded for 1 hour, during which the temperature reaches 70° C. The finished mill base is rolled, using a friction roller, to give a film, which is dried at 40° C. and then milled.

The formulation obtained contains 80% of pigment and, when used to pigment the binder described under I, the printing ink obtained gives deep, yellowish brown prints on paper and aluminum foil.

EXAMPLE 21

60 parts of Pigment Blue 15:1, C.I. 74,160, and 15 parts of the surfactant described in Example 9 are kneaded, with the addition of 18 parts of water, for 2 hours, after which the temperature of the mill base is 60° C. The finished mill base is rolled to give a film, which is dried at 45° C. and then comminuted to give a grit-like product.

The formulation obtained contains 80% of pigment and, when used to prepare the flexographic printing ink described under I, the printing ink obtained gives brilliant blue prints on aluminum foils, polyethylene films and paper.

When the formulation is stirred into the emulsion described in Example 12, a printing paste is obtained which gives brilliant blue prints on fabrics.

We claim:

1. A highly concentrated, dust-free, solid pigment formulation, consisting essentially of:
   (a) from 70 to 95% by weight of at least one finely divided pigment, and
   (b) from 5 to 30% by weight of at least one block copolymer surfactant obtained by reacting an amine of the formula

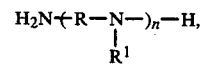

where R is $C_2$–$C_6$-alkylene, $R^1$ is H or $C_1$–$C_4$-alkyl and n is 1, 2, 3, 4 or 5, or R is 1,3-phenylene, 1,4-phenylene or 4,4'-diphenylenemethane, $R^1$ is H and n is 1, with propylene oxide and then reacting the product with ethylene oxide, said block copolymer possessing 20–45% by weight, based on the block copolymer, of ethylene oxide units and having a mean molecular weight of from 4,000 to 15,000, the percentages being based on (a+b).

2. The pigment formulation as claimed in claim 1, wherein (b) is a block copolymer having a mean molecular weight of from 11,000 to 15,000.

3. The pigment formulation as claimed in claim 1, wherein (b) is a block copolymer derived from ethylenediamine, 1,3-phenylenediamine or 1,4-phenylenediamine.

4. The pigment formulation as claimed in claim 2, wherein (b) is a block copolymer derived from ethylenediamine, 1,3-phenylenediamine or 1,4-phenylenediamine.

5. The pigment formulation as claimed in claim 1, wherein (b) is a block copolymer derived from ethylenediamine.

6. The pigment formulation as claimed in claim 5, wherein the block copolymer (b) has a molecular weight of from 11,000 to 14,000 and contains from 30 to 45% by weight, based on the block copolymer, of ethylene oxide units.

7. The pigment formulation as claimed in claim 1, wherein (a) is a finely divided inorganic or organic pigment.

8. The pigment formulation as claimed in claim 6, wherein (a) is a finely divided inorganic or organic pigment.

9. The pigment formulation as claimed in claim 1, wherein said pigment (a) is a titanium dioxide pigment, a carbon black pigment, an iron oxide pigment, a lead chromate/lead molybdate pigment, a nickel titanium yellow pigment, a chromium (III) oxide pigment or a mixture thereof.

10. The pigment formulation of claim 6, wherein said pigment (a) is a titanium dioxide pigment, a carbon black pigment, an iron oxide pigment, a lead chromate/lead molybdate pigment, a nickel titanium yellow pigment, a chromium (III) oxide pigment or a mixture thereof.

11. The pigment formulation as claimed in claim 1, wherein pigment (a) is an azo dye, a perylenetetracarboxylic acid diimide, a phthalocyanine, an anthroaquinone, a perinone, a thioindigo, a dioxazine, an isoindoline pigment, a polycyclic compound containing keto groups and at least 4 fused aromatic rings, heteroaromatic rings or both aromatic and heteroaromatic rings, a metal complex of a given pigment or mixtures thereof.

12. The pigment formulation as claimed in claim 6, wherein said pigment (a) is an azo dye, a perylenetetracarboxylic acid diimide, a phthalocyanine, an anthraquinone, a perinone, a thioindigo, a dioxazine, an isoindoline pigment, a polycyclic compound containing keto groups and at least 4 fused aromatic rings, heteroaromatic rings or both aromatic and heteroaromatic rings, a metal complex of a given pigment or mixtures thereof.

13. The pigment formuation as claimed in claim 1, wherein, in addition to components (a) and (b), said formulation contains from 0 to 5% by weight of at least one wax or an antifoaming agent, or a mixture of these additives.

14. The pigment formulation as claimed in claim 1, wherein, in addition to components (a) and (b), said formulation contains not more than 5% by weight, based on components (a) and (b), of at least one other agent (c) conventionally used in pigment formulations.

15. The pigment formulation as claimed in claim 14, wherein component (c) is aluminum hydroxide, a pH-controlling substance, or a mixture thereof.

16. A highly concentrated, dust-free, solid pigment formulation, consisting essentially of:
(a) from 70–95% by weight of at least one finely divided pigment, and
(b) from 5 to 30% by weight of at least one block copolymer surfactant obtained by reacting ethylenediamine with propylene oxide and then reacting the product with ethylene oxide, the block copolymer containing from 30 to 45% by weight, based on the block copolymer, of ethylene oxide units and having a mean molecular weight of from 11,000 to 14,000, the percentages being based on (a+b).

17. The formulation as claimed in claim 16, wherein said pigment (a) is a titanium dioxide pigment, a carbon black pigment, an iron oxide pigment, an lead chromate/lead molybdate pigment, a nickel titanium yellow pigment, a chromium (III) oxide pigment or a mixture thereof.

18. The formulation as claimed in claim 16, wherein said pigment is (a) is an azo dye, a perylenetetracarboxylic acid diimide, a phthalocyanine, an anthraquinone, a perinone, a thioindigo, a dioxazine, an isoindoline pigment, a polycyclic compound containing keto groups and at least 4 fused aromatic rings, heterocyclic rings or both aromatic and heteroaromatic rings, a metal complex of a given pigment or mixtures thererof.

* * * * *